(12) United States Patent
Sylvan

(10) Patent No.: US 7,767,908 B2
(45) Date of Patent: Aug. 3, 2010

(54) SEALING ELEMENT AND A METHOD FOR SEALINGLY MOUNTING OF A CABLE

(75) Inventor: Herman Sylvan, Lidingo (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1054 days.

(21) Appl. No.: 10/597,187

(22) PCT Filed: Jan. 14, 2005

(86) PCT No.: PCT/SE2005/000032

§ 371 (c)(1),
(2), (4) Date: Jul. 14, 2006

(87) PCT Pub. No.: WO2005/069710

PCT Pub. Date: Jul. 28, 2005

(65) Prior Publication Data

US 2008/0230996 A1     Sep. 25, 2008

(30) Foreign Application Priority Data

Jan. 16, 2004   (SE) .................................. 0400100

(51) Int. Cl.
*H02G 15/04* (2006.01)
*H02G 15/02* (2006.01)

(52) U.S. Cl. ................. 174/74 R; 174/77 R; 174/84 R; 174/72 A; 277/315; 277/616

(58) Field of Classification Search ............. 174/17 CT, 174/19, 20, 21 R, 24, 481, 564, 68.1, 68.3, 174/72 A, 72 R, 74 R, 77 R, 88 R, 135, 35 R, 174/35 C, 36, 84 R, 359, 655, 650, 93; 248/56; 277/607, 602, 608, 617, 906, 315; 16/2.1, 16/2.2; 439/89, 141, 140, 139, 135, 136, 439/138, 137
See application file for complete search history.

(56) References Cited

U.S. PATENT DOCUMENTS

| | | | |
|---|---|---|---|
| 2,441,206 A | | 5/1948 | Pevney |
| 2,958,845 A | * | 11/1960 | Dupre et al. ............... 174/77 R |
| 3,449,706 A | * | 6/1969 | Carissimi .................... 439/141 |
| 4,478,437 A | | 10/1984 | Skinner |
| 5,631,443 A | * | 5/1997 | Scrimpshire et al. ......... 174/359 |
| 5,886,294 A | * | 3/1999 | Scrimpshire et al. ......... 174/359 |
| 6,180,882 B1 | * | 1/2001 | Dinh ........................... 174/655 |
| 6,261,110 B1 | * | 7/2001 | Hatazawa .................... 174/359 |
| 6,429,373 B1 | * | 8/2002 | Scrimpshire et al. ....... 174/74 R |
| 6,482,017 B1 | * | 11/2002 | Van Doorn ................... 439/89 |
| 6,605,781 B2 | * | 8/2003 | Milanowski et al. ....... 174/74 R |
| 6,743,980 B2 | * | 6/2004 | Milanowski et al. ........ 174/135 |

\* cited by examiner

*Primary Examiner*—Angel R Estrada

(57) ABSTRACT

The invention relates to a flexible sealing element sealingly attached to a cable intended for connection to attachment means on e.g. the roof of a base station cabinet. When attaching the cable the front end of the sealing element is retracted to a position uncovering connecting means at the cable end. After attachment the front end is moved back to a position covering the connected cable end.

9 Claims, 2 Drawing Sheets

SEALING ELEMENT AND A METHOD FOR SEALINGLY MOUNTING OF A CABLE

FIELD OF THE INVENTION

The present invention relates to an arrangement for sealing a cable transit in a wall of an apparatus room or apparatus casing or a corresponding counterpart.

BACKGROUND

In apparatus rooms for electric equipment there are necessarily a number of inlets and outlets for power supply, signal feeders, antennas or the like. Especially when such houses with equipment are exposed to difficult environment conditions, like weather conditions when the equipment is sited outdoors, in dusty surroundings or otherwise polluted areas, it is important that appropriate sealings are arranged in association with the inlets and outlets.

In the mobile telecommunication field, like GSM, WCDMA and other modem technologies, radio base stations, RBS, are frequently used and for economic reasons they are often placed outdoors. Such RBS comprises mainly of a cabinet for electronic equipment placed on the ground and an antenna with its mast situated nearby. A feeder cable runs from the-cabinet to the antenna. It is desirable that the feeder is of correct length and as short as possible. For these reasons it is preferred to have the antenna feeder outlet on the roof of the cabinet.

However if the outlet is placed on top of the cabinet, the quite straight substantially vertical antenna cable functions as a conductor of water in the event of atmospheric precipitation. In this case water may be very liable to run into the inner part of the coupling and possibly also into the apparatus housing, if the seal is not satisfactory.

SUMMARY

The aim of the present invention is to provide an arrangement that will enable a cable transit opening to be placed at any desired location in any desired wall structure of an apparatus room or apparatus casing, including its ceiling or floor, without the chosen location of said opening constituting a risk of water, moisture or minute solid particles penetrating into the room or casing through said opening.

This aim is achieved in accordance with the present invention by means of a sealing arrangement which is characterized primarily in that it includes a rigid tubular element which is sealingly connected around the full periphery of said opening and which projects out from the outer side of said wall such as to form a passageway that leads into the interior of the room or casing, and in that the arrangement includes a flexible sealing element, which sealingly closes said passageway, wherein the front end of the sealing element has a sleeve-like end portion which can be fitted onto the tubular element and which enables the sealing element to be fitted in tight abutment with said tubular element around its full periphery.

According to the present invention, the sealing element may be adapted to sealingly close said passageway by virtue of its co-action with an external electric cable intended for connection to electrical equipment installed in the apparatus room or apparatus casing.

The sealing element is preferably comprised of a gaiter which has, at its rear end, a sleeve-like part by means of which the gaiter can be brought into sealing abutment with the outer barrel surface of a part of said cable, around the full circumference of the cable.

This stocking-like gaiter element will conveniently include a generally cylindrical front portion and a generally cylindrical rear portion preferably of smaller diameter than the front portion. An elongate connecting part is situated between said two portions. The intermediate connecting portion preferably has a generally conical form.

The connecting portion of the gaiter element is capable of supporting the front part of the element stably in two different position in relation to the rear part of said element, namely in a forwardly displaced position in which the front portion is situated at a considerable axial distance from the rear portion, and a rearwardly withdrawn position in which the front portion is situated close to the rear portion at least partially overlapping said portion.

When the connecting portion has a generally conical shape, as before mentioned, the function of the invention can be improved by reducing the material thickness of the connecting portion in a direction from its rear end towards its front end, and by joining said connecting portion with said front portion by means of a narrow or thin flange that projects radially outwards therefrom.

In order to enhance the grip of the rear part of the sealing element around a cable and to achieve highly reliable sealing between said rear part and the cable in the absence of any further means, said part of the stocking-like element may conveniently include a plurality of internal, peripherally extending ridges that are mutually separated by peripherally extending grooves. Alternatively, this part of the sealing element may be crimped around the cable, glued or firmly clamped thereto with the aid of a clamping ring or technically equivalent means, for the same purpose. A combination of said tightening means could also be used.

The sealing element conveniently consists of an elastic or flexible material. A silicone rubber can be mentioned as an appropriate material in this regard.

SHORT DESCRIPTION OF THE FIGURES

DETAILED DESCRIPTION OF PREFERRED EMBODIMENTS

The invention will now be described in more detail with reference to the drawings.

Figure 1:
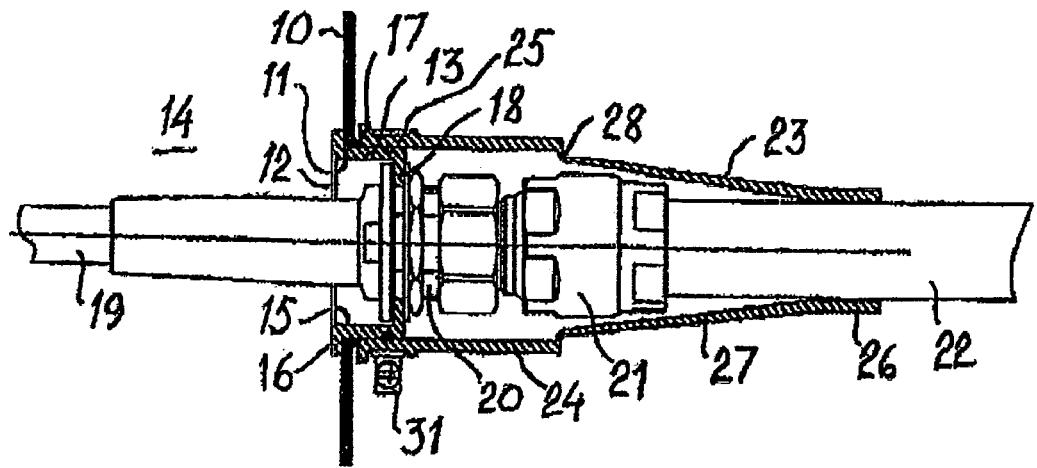
FIG. 1 is a cross-sectional view of one exemplifying embodiment of an inventive sealing arrangement shown in a cable transit opening in a wall portion of an apparatus room, and also shows an outer cable connected to an inner cable in said transit opening.

The reference numeral 10 in FIG. 1 identifies a steel-plate outer wall of an apparatus room or shelter, while reference numeral 11 identifies a cable transit opening provided in the wall.

A steel element 12 is rigidly mounted in the opening. The element 12 includes a main part 13 in the form of a tubular member of circular cross-section that extends out from the outer side of said wall 10 and that delimits a passageway 15 leading to the space 14 situated inwardly of the wall 10.

The inner end of the element 12 includes a radially and outwardly projecting ring-shaped flange 16 which abuts the inner side of the wall 10. The element 12 is connected sealingly to the wall 10 around the full circumference of the opening 11, by means of a weld 17. The element 12 is provided at its outer end with a ring-shaped flange 18 which projects radially inwards in a direction from the main part 13. This flange functions as an attachment for a contact device 20 fitted to one end of a cable 19 situated in the space 14 inside the apparatus room.

Reference numeral 21 identifies a contact device fitted to one end of an external cable 22, said contact devices 20, 21 being joined together such as to mutually connect the cables 19 and 22.

Figure 3:
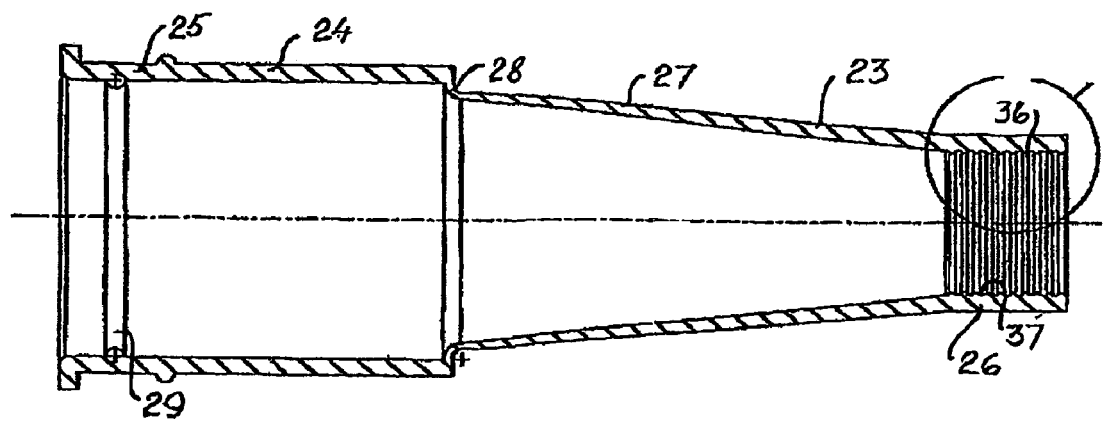
FIG. 3 is a cross-sectional view of said sealing element shown in larger scale.

The ingress of water, moisture or minute solid particles into the space through the passageway 15 is prevented, by providing a flexible sealing element that sealingly closes said passageway. In the case of the embodiment illustrated, this sealing element is comprised of a gaiter-like element 23 fitted to the cable 22, said element 23 being shown in more detail in FIG. 3.

The gaiter element 23 includes a cylindrical front portion 24 which forms a front end-portion 25 that can be fitted to the main part 13 of the element 12 and which can be brought into sealing abutment with said main part 13 around its full circumference. The element also includes a cylindrical rear portion 26 that has a reduced diameter in relation to the front portion 24, and also includes a conical elongate connecting part 27 between said front and rear portions. The cylindrical rear portion 26 forms a rear sleeve-like end-part of the element by means of which the element can be brought into sealing abutment with the outer barrel surface of part of the cable 22. As a result of the aforedescribed design, the element is able to sealingly close the passageway in co-action with the cable 22. With the intention of enhancing the mechanical strength of the rear part 26 of the gaiter element on the cable 22 and also in providing an extremely reliable seal between said part and the cable, the rear part 26 can be provided with a plurality of inner, peripherally extending ridges 36 and peripherally extending grooves 37 located therebetween.

Figure 2:
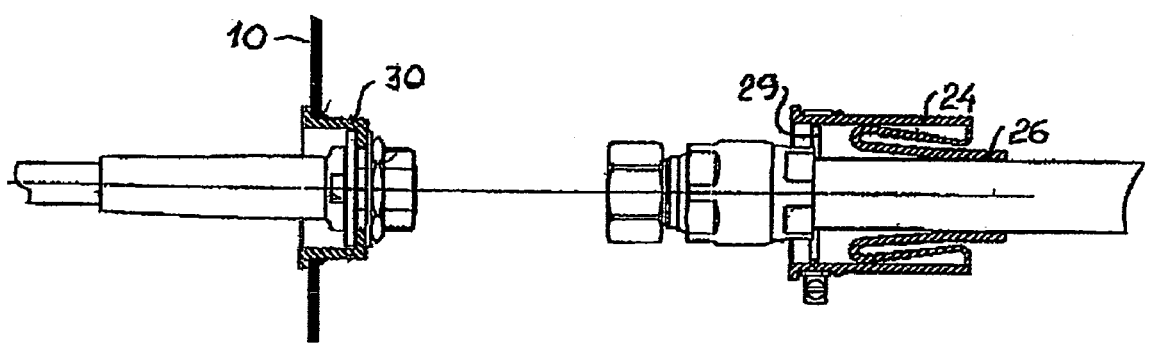
FIG. 2 is a corresponding view illustrating the outer cable in a spaced relationship with the inner cable.

In order to facilitate mutual connection of the two contact devices 20 and 21, the aforesaid connecting part 27 is adapted to support the front part 24 stably in two different positions in relation to the rear part 26. These two positions consist, on one hand, of a forwardly displaced position shown in FIG. 1, in which the leading part 24 is located at a relatively large axial distance from the rearward part 26, said distance being determined by the maximal length of the connecting part 27, and projects out in front of the contact device 21, wherein, on the other hand the second position is a withdrawn position shown in FIG. 2 in which the leading front part 24 is situated close to the rearward part 26 and partially overlaps the same whilst exposing the connection device 21 at the same time thus facilitating the connection of the cable to the counterpart.

In order to achieve the aforedescribed function of the connecting part 27, said part has preferably been given a material thickness that decreases from its rear end towards its front end. It has also been connected to the front part 24 with the aid of a thin flange 28 that projects out from said connecting part in a generally radial direction.

The front end portion 25 of the sealing element 23 that can be fitted to the main part 13 of the counterpart element 12 includes an inner ring-shaped bead 29 which is intended for engagement with an outer ring-shaped groove 30 in the part 13. This will provide a visual indication of the fact that the end portion 25 has been placed in its intended position on the part 13. The bead 29 also enables reinforced attachment of the end portion 25 to be achieved on the part 13 when fitted. However, a clamping ring 31, for instance a hose clamp, may be applied to the end part 25 for further reinforcement of both the attachment of the end part to the part 13 and also reinforcement of the seal between said two elements.

Figure 4:
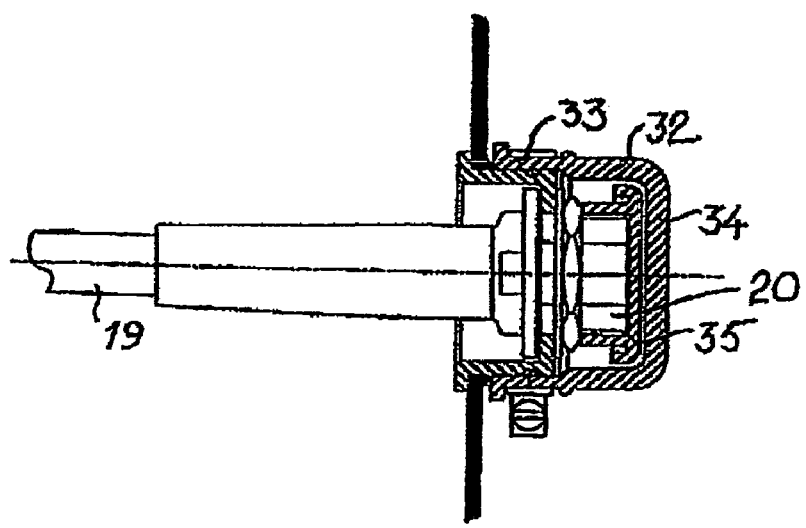
FIG. 4 is a cross-sectional view of the cable transit corresponding to the view of FIG. 1 and illustrating a protection cap for the cable transit opening when not in use.

FIG. 4 illustrates a sealing cap 32 intended for use as a sealing connection of a cable transit, where no outer cable is connected at this time.

The cap 32 includes a front end portion 33 which can be fitted to the part 13 and which is designed similarly to the end portion of the sealing element 23, whereas the rear end of the cap 32 includes an end wall 34 that outwardly closes the portion 33. The reference numeral 35 identifies a rigid hat which is fitted inwardly of the cap 32 and which functions to provide extra protection to the electric contact device 20 that is fitted inwardly of the cap 32, and which also functions to provide extra projection to the electric contact device 20 against damage from external forces. The cap 32 and the gaiter-like element 23 may both be produced conveniently from silicone rubber. It will be understood, however, that other weather-resistant materials that have good elastic or flexible properties within a large temperature range may also be used.

When applying the invention for sealingly mounting of e.g. an antenna feeder cable on the roof of an RBS cabinet, the process is started with the removal of the protection cap 32, shown in FIG. 4. A preferably fixed length of an antenna cable with associated connecting means 21 and a gaiter 23 in its retracted position-as in FIG. 2-is connected to inlet connecting means 20 of the RBS cabinet. The rear part of the gaiter could be more or less fixed to the feeder already on delivery using any of the aforementioned tightening means. The front part of the gaiter element 23 is then moved to the position shown in FIG. 1. If enhanced sealing properties are desirable a clamping ring 31 is then used to tighten the joint between the forward end 24 of the gaiter and the connecting parts of the cabinet.

The invention has so far been illustrated in the figures with a side mounted inlet for antenna feeders. It is however obvious that the same construction is suitable for other positions of the mountings in the bottom or top of housings for electric equipment. Thereby, for the last mentioned top mounting, the invention solves the raining water problems with the cable on its outside acting as a more or less vertical water conductor related to in the Background part of this description. The front part of the connection should in this regard be considered as the lower part of the sealing, while the rear part corresponds to the top part.

The sealing element is preferably elastic or at least flexible, and made from rubber or some corresponding material, so as to provide an effective seal at both ends and also to enable the sealing element to be displaced between its two positions. But, it is not necessary that the material has elastic properties like the ones rubber has. Any material and any design that enables the described positional change to be achieved are included in the invention. One example in this regard resides in a material that is "foldable" along a periphery of the cylindrical material, so that it can be "rolled" over a movable peripheral "fold" between said two end positions.

The invention has been conceived primarily with the object of improving the possibility of selectively positioning requisite cable transits in walls of steel-sheet shelters that function to accommodate apparatus connected to mast-mounted antennas in Radio Base Stations for mobile telecommunication systems. The invention, however, can also be applied to other connections of cables apparatus rooms or like counterparts, where the need for proper sealings or protection is necessary. For example, in the case of general joining of a cable in the absence of any connection with an apparatus casing, one part may have a configuration that corresponds generally to the right hand side of FIG. 1, whereas the left hand part is not attached to a wall but has a portion that corresponds to the tubular element or pipe socket around which the front part of the sealing element is fitted. Other end to end joining of cables may use the sealing element of the invention on both parts of the joint. Other embodiments are thus conceivable within the scope of the present invention which only limitations are defined in the accompanying claims.

The invention claimed is:

1. A sealing element for a cable transit opening provided in a wall of an apparatus housing, wherein:
the sealing element has the form of an open-ended gaiter which can be fitted to an outer cable intended for connection to equipment situated in said apparatus housing, said gaiter having a generally cylindrical rear end-part that can be fitted to the cable in sealing abutment with its outer barrel surface, and a generally cylindrical front end-part adapted for sealing abutment with an outer barrel surface tubular socket which projects out from said wall at said cable transit opening, wherein the sealing element includes an elongate, flexible connecting part which movably connects the two end-parts together, wherein said connecting part is adapted to support the front gaiter end-part stably in two mutually different positions in relation to the rear end-part of the gaiter, namely in a forwardly displaced position in which the front end-part is located at a significant axial distance from the rear end-part, and a withdrawn position in which the front end-part is located axially close to the rear end-part, and wherein said front end-part at least partially overlaps the rear end-part when in said withdrawn position.

2. The sealing element of claim 1, wherein said connecting part has a generally conical shape in said forwardly displaced position.

3. The sealing element of claim 2, wherein said connecting part has a material thickness which decreases in a direction from its rear end to its front end, and wherein said connecting part is connected to the front end-part by means of a narrow flange which projects outwardly from said connecting part in a generally radial direction.

4. The sealing element of claim 1, wherein said sealing element is comprised of silicone rubber.

5. A sealing element for a cable transit opening provided in a wall of an apparatus housing, wherein:
the sealing element has the form of an open-ended gaiter which can be fitted to an outer cable intended for connection to equipment situated in said apparatus housing, said gaiter having a generally cylindrical rear end-part that can be fitted to the cable in sealing abutment with its outer barrel surface, and a generally cylindrical front end-part adapted for sealing abutment with an outer barrel surface tubular socket which projects out from said wall at said cable transit opening, wherein the sealing element includes an elongate, flexible connecting part which movably connects the two end-parts together, and wherein said rear end-part of the gaiter includes a plurality of peripherally extending ridges and peripherally extending grooves disposed there between.

6. A sealing element for a cable transit opening provided in a wall of an apparatus housing, wherein:
the sealing element has the form of an open-ended gaiter which can be fitted to an outer cable intended for connection to equipment situated in said apparatus housing, said gaiter having a generally cylindrical rear end-part that can be fitted to the cable in sealing abutment with its outer barrel surface, and a generally cylindrical front end-part adapted for sealing abutment with an outer barrel surface tubular socket which projects out from said wall at said cable transit opening, wherein the sealing element includes an elongate, flexible connecting part which movably connects the two end-parts together, and wherein said front end-part of the gaiter includes an inner ring-shaped bead which is intended for engagement with an external ring-shaped groove in said tubular socket.

7. A method for sealingly mounting of a cable to a counterpart with a tubular socket projecting from it using a flexible gaiter-like sealing element, said method comprising the steps of:
sealingly fixing a rear-end of the sealing element to the cable thereby partly covering connecting means at the cable end;
uncovering the connecting means by moving the front end-part of the sealing element to a retracted position using the inherent flexibility of the element while essentially keeping the rear end in its fixed position;
connecting the cable to the counterpart via the tubular socket;
moving the front end-part of the sealing element back to its initial forwardly displaced position, thus sealingly covering the connection between the cable and the tubular socket of the counterpart, wherein the front end-part of the sealing element is clamped to the tubular socket using a clamping ring.

8. The method of claim 7, wherein the rear end-part of the sealing element is sealingly fixed to the cable using inherent elasticity of the sealing element or crimped or glued to the cable.

9. The method of claim 8, further comprising the step of securing said rear end-part of the sealing element to said cable using a clamping ring.

* * * * *